US005675512A

United States Patent [19]
Ireton et al.

[11] Patent Number: 5,675,512
[45] Date of Patent: Oct. 7, 1997

[54] LOW-COST ROOM-BASED VIDEO CONFERENCING SYSTEMS

[75] Inventors: Shelley D. Ireton, Portland, Oreg.; Christina K. Liu, Oakland, Calif.

[73] Assignee: Intel Corporation, Santa Clara, Calif.

[21] Appl. No.: 584,183

[22] Filed: Jan. 11, 1996

[51] Int. Cl.[6] .................................................. G06F 17/00
[52] U.S. Cl. .................................................. 364/514 R
[58] Field of Search ........................ 364/514 R, 715.02; 395/153, 139; 348/13, 15

[56] References Cited

U.S. PATENT DOCUMENTS 5,375,068  12/1994  Palmer et al. ...................... 364/514 R
5,557,728   9/1996  Garrett et al. ...................... 395/139

OTHER PUBLICATIONS

Soares et al. "Lan Based Real Time Audio-Graphics Conferencing System." IEEE 1989.
Lake et al.; "A Network Environment For Studying Multimedia Network Architecture And Control." IEEE 1989.
Ahuja et al.; "Networking Requirements Of The Rapport Multimedia Conferencing System." IEEE 1988.
Handmade Software, Inc.;"Image Alchemy" 1991.

Primary Examiner—Ellis B. Ramirez
Attorney, Agent, or Firm—Blakely, Sokoloff, Taylor & Zafman

[57] ABSTRACT

A low cost room-based videoconferencing system for videoconferencing between many stations. In the invention, each station includes a computer running a windowing operating system and PROSHARE. It also includes a communication link connecting the computer and one or more of the videoconferencing stations. In addition there are video and audio input devices connected to the computer. A DCI-enabled video card is connected to the computer. A NTSC converter is connected to the output of the DCI enabled graphics card and one or more NTSC television monitors are connected to the NTSC converter. PROSHARE manages the videoconferencing sessions and provides a small video image. The DCI-enabled video card stretches the small PROSHARE image to a full screen image which is then converted by the NTSC converter and displayed on an inexpensive NTSC television monitor.

9 Claims, 1 Drawing Sheet

LOW-COST ROOM-BASED VIDEO CONFERENCING SYSTEMS

1. Field of The Invention

The present invention relates to video conferencing. More particularly, it relates to the use of personal computers, existing software and inexpensive televisions to provide video conferencing for a room full of conferees.

2. Description of the Prior Art

Video conferencing techniques call for broadcasting live, two-way video interactively between two or more remote locations. Video conferencing provides a means for people at distant locations to simulate a live face to face meeting. A video camera, speaker phone and computer are needed for each site. Videoconferencing software manages the equipment and the session. It is interactive in that it allows everyone to make changes that others can see in real time. A window based graphical user interface is employed so that live video feed can be seen in one window while other computer generated images are available in other windows. The current industry videoconferencing standard is defined by CCITT and is referred to as P×64. H.320 is the latest specification within P×64. It defines ISDN based multipoint videoconferencing.

Videoconferencing can be done with desk top systems where the intended users are limited to one or two at each station. Alternatively, so called room-based video conferencing systems allow a small group of persons to be involved at each station. Current room-based video conferencing systems are expensive packages of bulky equipment. For example, a current room-based video conferencing system costing many thousands of dollars typically consists of two dedicated 27-inch monitors, one or possibly two cameras, a dedicated CPU, a control box and a cabinet to house the components. As a result, room-based videoconferencing has remained very expensive, and thus not widely used. Accordingly, there is a great need for a lowcost, room-based videoconferencing system.

SUMMARY OF THE INVENTION

The present invention is a low cost room-based videoconferencing system for videoconferencing between many stations. In the invention, each station includes a computer running a windowing operating system and PROSHARE. It also includes a communication link connecting the computer and one or more of the videoconferencing stations. In addition there are video and audio input devices connected to the computer. A DCI-enabled video card is connected to the computer. A NTSC converter is connected to the output of the DCI enabled graphics card and one or more NTSC television monitors are connected to the NTSC converter.

BRIEF DESCRIPTION OF THE DRAWING

The preferred embodiment will now be described in connection with the Drawing in which.

DESCRIPTION OF THE PREFERRED EMBODIMENT

Figure 1:
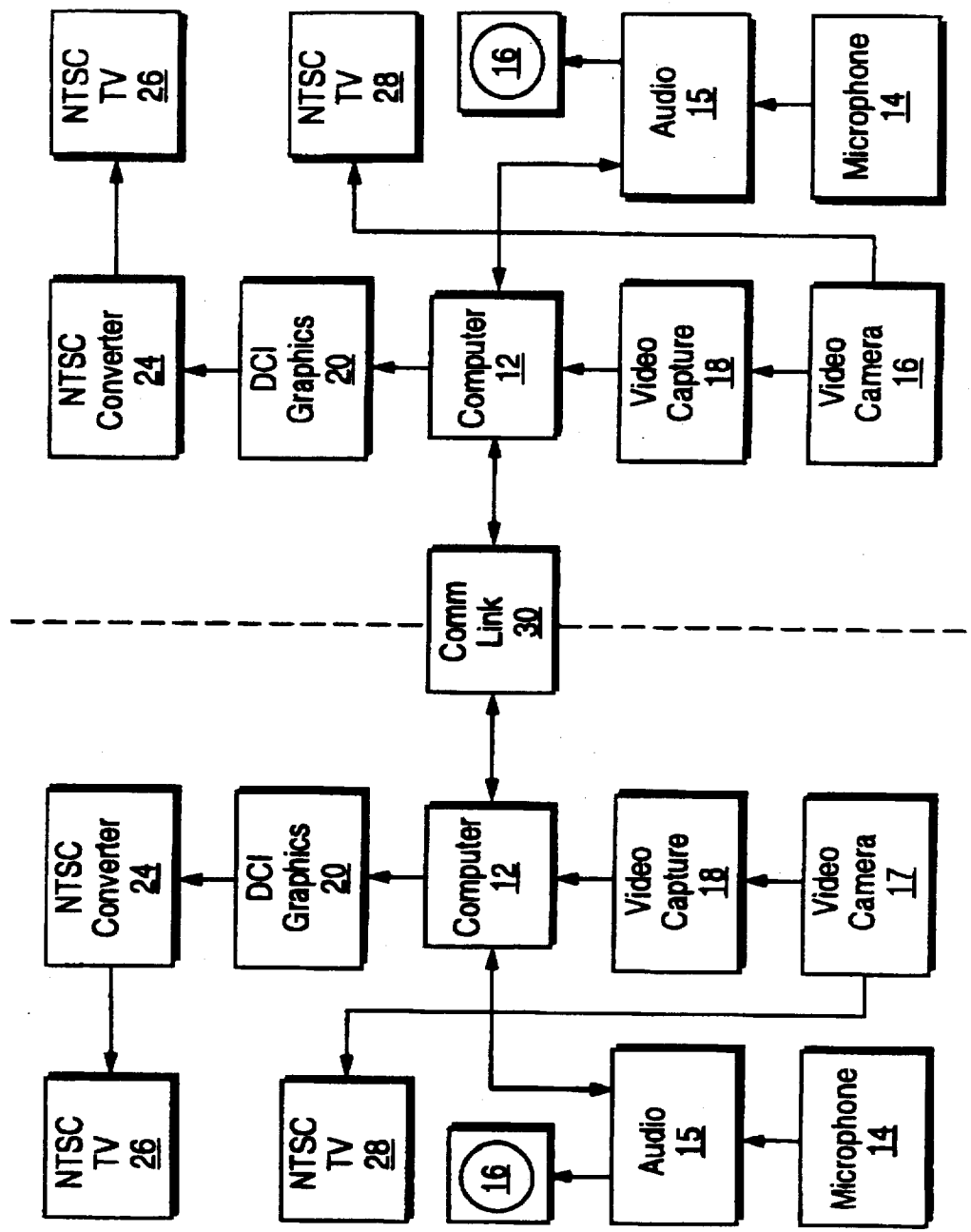
FIG. 1 is a is a block diagram of the present invention.

The present invention greatly reduces the cost of room-based video conferencing by utilizing a standard desktop PC and off-the-shelf components. It is interoperable with H.320 and with PROSHARE, a videoconferencing software and hardware system for the personal computer manufactured by Intel Corporation. The invention allows seamless dataconferencing as well.

FIG. 1 is a block diagram of the system of the present invention. FIG. 1 shows two videoconferencing stations according to the present invention connected by a communication link. Referring now to FIG. 1, a room-based videoconferencing station 10 has as its nucleus a desk top computer 12. This computer would preferably be a commercially available model based on a high speed PENTIUM or PENTIUM PRO microprocessor manufactured by Intel Corporation. An off-the-shelf microphone 14 is connected through an off-the-shelf audio card 15 to computer 12. Audio card 16 may be any of several models manufactured by the SoundBlaster company as well as other manufacturers. Audio speakers 16 are also connected to audio card 15. A video camera 17 is connected to video capture card 18 which is turn connected to computer 12. Video capture card 18 converts the analog video images to digital data and can compress the data. The digital video data is then stored in the computer's memory.

A DCI enabled video graphics card 20 is connected to the ISA or PCI bus of computer 12. DCI (device control interface) allows stretching from a small pixel count image to a full screen pixel count image. Several off-the-shelf video cards have been DCI enabled. Examples are: MILLENIUM manufactured by Matrox, MACH 32 manufactured by ATI. Video graphics card 20 is connected to NTSC converter 24. NTSC converter 24 converts a VGA or higher pixel count image generated by graphics card 20 to a video signal that conforms to the NTSC standard and thus can be supplied to a conventional and inexpensive television set. Such devices are available off-the-shelf—for example "GameTV" model. A conventional large screen NTSC television set or NTSC monitor 26 is connected to NTSC converter 24 and displays the video images as well as playing the audio through its speakers. A second NTSC television set is connected directly to NTSC video camera 17. Alternatively, one or both of NTSC televisions 26 or 28 may be VGA computer monitors. However these devices are much more expensive than NTSC televisions. Communications link 30 may be an ISDN interface to a local carrier or it may a LAN interface card to a local area network.

Computer 12 runs Microsoft WINDOWS 3.1 or WINDOWS 95 as an operating system. Operating under WINDOWS 3.1, PROSHARE manages the videoconferencing interactivity. The PROSHARE system consists of hardware that provides either an ISDN or LAN interface, audio functionality and video functionality. That is, PROSHARE provides the functionality shown in audio block 15, microphone 14, video capture 18 and communication link 30. PROSHARE, however, provides a small, low pixel count image. Without further processing, this image is much too small for a room-full of user to effectively see.

The present invention, however, provides image stretching means that expands the low pixel count image provided by PROSHARE to a pixel count for a full sized image. The stretching means can be a DCI-enabled graphics card 20 operating under WINDOWS 3.1 or it can be Direct Draw which is supported by WINDOWS 95. Either of these two systems takes the image provided by PROSHARE and adds pixels by interpolation so that the resulting image has sufficient pixels to provide either a conventional VGA image or a NTSC image. The video image can thus be seen by multiple people in a room size videoconferencing environment.

A video camera supplies a video signal to both the PROSHARE video board as well as to one NTSC television. By doing this, the local video can be viewed "live" on one of the televisions without having to use any processing cycles of computer 12. The second television serves as computer 12's monitor and displays the standard WINDOWS and PROSHARE interfaces. The PROSHARE video system operates in computer 12 normally.

A system has been described for inexpensively providing room-based videoconferencing capability using only commercially available, off-the-shelf hardware components and software. Therefore, within the scope of the appended claims, the invention may be practiced other than as specifically described herein.

What is claimed is:

1. A room based videoconferencing system having a plurality of videoconferencing stations, each station comprising:
    a computer having video conference imaging means that provides a videoconference image;
    a communication link connecting said computer and one or more of said videoconferencing stations;
    an audio input device connected to said computer;
    a NTSC video camera;
    a video capture card connected to said computer and to said NTSC video camera;
    a graphics card connected to said computer;
    a NTSC converter connected to said graphics card; and
    a NTSC television monitor connected to said NTSC converter.

2. The system of claim 1 further including a second NTSC monitor connected to said NTSC camera.

3. The system of claim 1 wherein said video conference imaging means provides an image having fewer pixels than a NTSC image.

4. The system of claim 3 wherein said video conference imaging means is PROSHARE.

5. The system of claim 3 further including means connected to said computer for adding pixels to said videoconference image sufficient to create a full NTSC image.

6. The system of claim 5 wherein said means for adding pixels is a DCI enabled video card.

7. The system of claim 5 wherein said means adding pixels is Direct Draw running on said computer.

8. The system of claim 1 wherein said audio input includes a microphone and a sound card.

9. A room-based videoconferencing system having a plurality of videoconferencing stations, each station comprising:
    a computer having video conference imaging means that provides a videoconference image having fewer pixels than a NTSC image;
    a communication link connecting said computer and one or more of said videoconferencing stations for communicating said videoconference images;
    a video graphics card connected to said computer for generating a VGA or higher pixel count image from said video conference image supplied by said computer;
    a NTSC converter connected to said graphics system for converting said VGA or higher pixel count image to a NTSC image;
    a first NTSC television monitor connected to said NTSC converter for displaying said NTSC image; and
    a NTSC video camera;
    a video capture card connected to said computer and to said NTSC video camera for digitizing NTSC images supplied by said NTSC video camera;
    a second NTSC monitor connected to said NTSC video camera for displaying images generated by said NTSC video camera.

* * * * *